United States Patent
Shivakumar

(10) Patent No.: US 9,613,341 B2
(45) Date of Patent: Apr. 4, 2017

(54) CALCULATING TRUST SCORE ON WEB BASED PLATFORM

(71) Applicant: Infosys Limited, Bangalore (IN)

(72) Inventor: Shailesh Kumar Shivakumar, Bangalore (IN)

(73) Assignee: Infosys Limited, Bangalore (IN)

( * ) Notice: Subject to any disclaimer, the term of this patent is extended or adjusted under 35 U.S.C. 154(b) by 360 days.

(21) Appl. No.: 14/170,103

(22) Filed: Jan. 31, 2014

(65) Prior Publication Data

US 2014/0289261 A1    Sep. 25, 2014

(30) Foreign Application Priority Data

Mar. 21, 2013  (IN) .......................... 1236/CHE/2013

(51) Int. Cl.
   *G06F 17/30*   (2006.01)
   *G06Q 10/10*   (2012.01)
   *G06Q 30/02*   (2012.01)
   *G06Q 50/00*   (2012.01)

(52) U.S. Cl.
   CPC ....... *G06Q 10/101* (2013.01); *G06Q 30/0282* (2013.01); *G06Q 50/01* (2013.01)

(58) Field of Classification Search
   CPC ..... G06Q 30/0282; G06Q 50/01; H04L 67/22
   See application file for complete search history.

(56) References Cited

U.S. PATENT DOCUMENTS

| 2011/0113098 A1 | 5/2011 | Walsh et al. |
| 2011/0167071 A1* | 7/2011 | Yang ...................... G06Q 30/02 707/741 |
| 2011/0270774 A1* | 11/2011 | Varshavsky ............ G06Q 10/10 705/319 |
| 2012/0023108 A1 | 1/2012 | Slinker et al. |

OTHER PUBLICATIONS

John O'Donovan, "Capturing Trust in Social Web Applications", Abstract, www.link.springer.com, 2009, 1 page.*

* cited by examiner

*Primary Examiner* — Cheryl Lewis
(74) *Attorney, Agent, or Firm* — Klarquist Sparkman, LLP

(57) ABSTRACT

A method for calculating trust level of a user on social networking sites, comprising: consolidating information related to users operatively associated with at least a web based social platform; assigning weight to each of the consolidated information; computing aggregated score for at least an information; computing weighted average of the aggregated scores of the information; and calculating trust score based on the weighted average score. It further comprises assigning a trust level to the users based upon the trust. The method enables a user to create web of trust for social contacts or friends on the web based social platform wherein the web of trust comprises of most trusted friends, average trusted friends and least trusted friends.

20 Claims, 8 Drawing Sheets

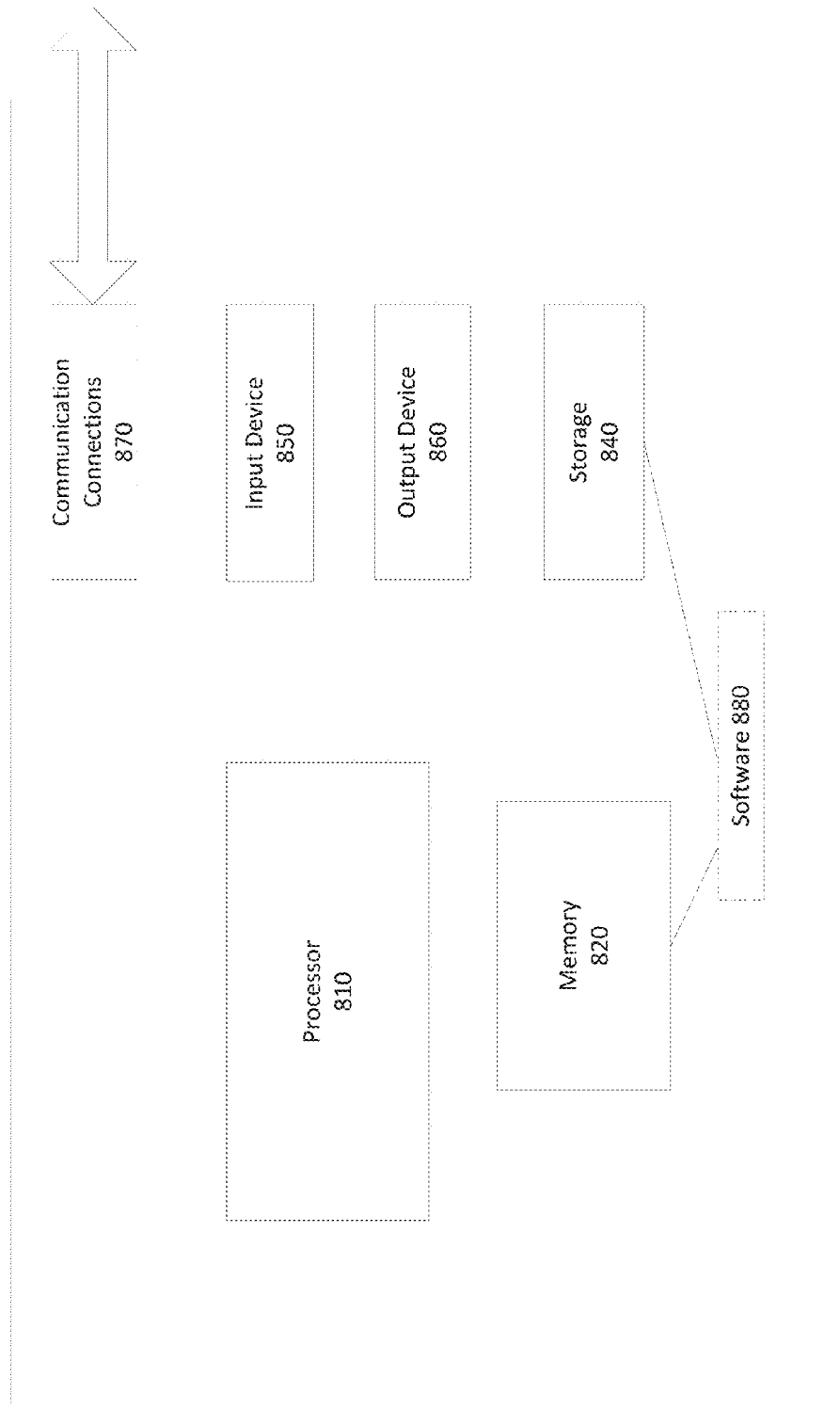

CALCULATING TRUST SCORE ON WEB BASED PLATFORM

FIELD

The field relates to calculating trust score in general and a system and method to calculate trust score of users operatively associated with a web based platform in particular.

BACKGROUND

All social media platforms allow users to create a group of friends and community with whom the users shares the personal and social information including social activities like posts, recommendations, personal interests etc. Current social media platforms provide a loose model for making an online social contacts including friends, online companions, chat buddies etc. The existing model is mostly user driven. Most social platforms encourage social user to maximize his/her social contacts in order to increase user activity or time on the site thereby increasing their revenue. Most of the current social platform heavily provides friend suggestions to increase social user's circle of friends. Social users perform various activities with online social contacts including sharing personal information, chat and other community activities. Social media platform provides numerous ways to share the data like profile information, comments etc. with their online social contacts. All social media platforms allow the user to create a group of friends and community with whom the user shares the personal and social information including social activities like posts, recommendations, personal interests etc.

Although existing social media sites allow finer control for sharing information, most of the current models require user intervention for leveraging that fine-grain custom control by adding extra filters; often it is a cumbersome process to selectively filter sensitive information. User more often than not ignores safety concerns due to the extra steps required for achieving fine grain controls leaving his/her data vulnerable to the outside world. In most cases, user falls back on his/her past experience and interactions with a person to qualify him/her as a "friend" or 'social contact' and establish the "trust" to a friend. A social user is unaware of all the activities of his/her social contacts/friends across various networking social sites. It often results in incorrect/incomplete/false perception about the friend/social contact. Limited information about friend's activities poses challenges in friend profiling. Friendship is often a personal notion in the social world.

There are no tools or processes to objectively decide or suggest a trust worthiness of a friend. This lack of objective trust verification would potentially lead to social user's data exploitation and security issues like identity theft, cyber bully, Cyber stalking, cyber defamation etc.

SUMMARY

Accordingly there is need of system and method which can quantify a user's trust by consolidating a user's information and related activities on social networking sites and assigning a trust score to the user and to do fine tuning of social contacts in the social networking sites.

It is an object of the invention to provide a system and method for calculating trust score of users operatively associated with web based platforms.

It is another object of the invention is to consolidate plurality of information related to the user available on the web based platforms.

Yet another object of the invention is to associate a weightage to each of the plurality of the related information of the user.

Still another object of the invention is to compute aggregate weighted score for each of the plurality of the related information of the user.

Yet another object of the invention is to create a web of trust for plurality of connected users operatively associated with the web based platform by assigning a rank to the connected users on basis of trust score.

Still further another objective of the invention is to enhance online security on web based platform.

BRIEF DESCRIPTION OF DRAWINGS

FIG. 8 shows an exemplary computing environment.

While systems and methods are described herein by way of example and embodiments, those skilled in the art recognize that systems and methods for calculating trust scores of users operatively associated with a web platform are not limited to the embodiments or the diagrams described. It should be understood that 'web based platform', 'web based environment', 'social networking site', 'social web based platform', 'networking sites' and 'social sites' may be used interchangeably. As used herein, 'social user', 'social web users', 'online social content community' and 'social contacts' are the users of social networking sites unless indicated otherwise. 'Trust ranking engine', 'Trust Ranking Software', 'Trust Ranking System' and 'Trust Ranking Platform' are used interchangeably. It should be understood that drawings and descriptions are not intended to be limiting to the particular form disclosed. The word "may" is used in a permissive sense (i.e., meaning having the potential to) rather than the mandatory sense (i.e., meaning must). Similarly, the words "include", "including", and "includes" mean including, but not limited to.

DETAILED DESCRIPTION

Disclosed embodiments provide computer-implemented method, system and computer readable media for calculating trust score of users operatively associated on a web based platform.

According to an embodiment trust ranking system addresses the problems in prior art by quantifying a user's trust by evaluating the user's interactions and activities on the web based platform to which the user is operatively associated with. The trust ranking or trust score of the user may be considered by network of the users to which the user is connected to on a web based platform to share information and online interactions more reliably and scientifically.

Figure 1:
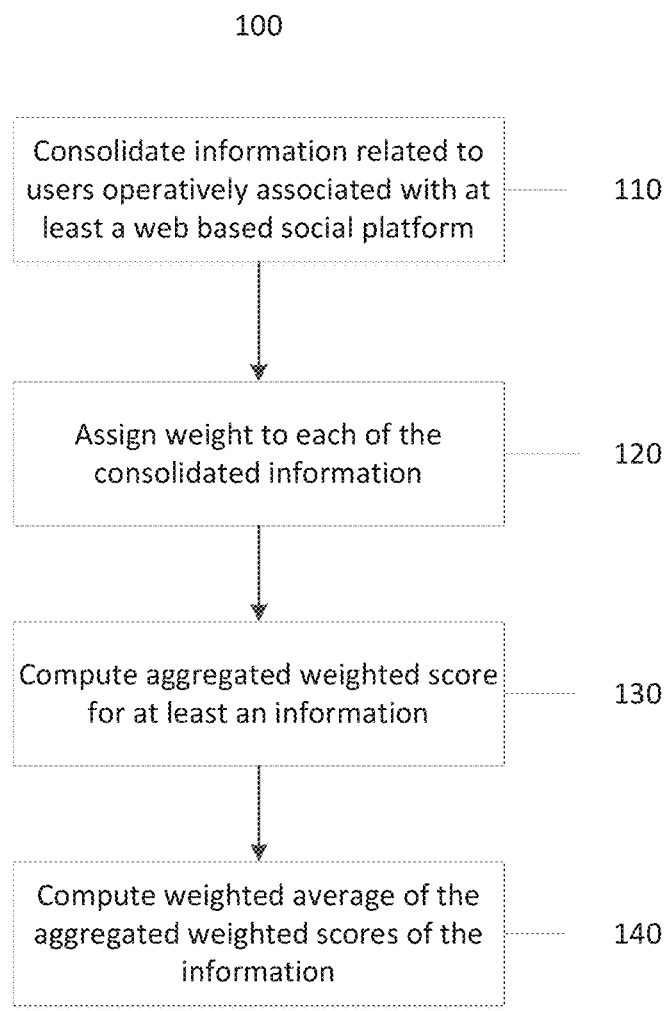
FIG. 1 shows an exemplary process flow for calculating trust score of user operatively associated with the web based platform.

FIG. 1 shows an exemplary process flow for calculating trust score of user operatively associated with the web based platform. According to an embodiment of the invention the method of calculating trust score of users operatively associated with a web based platform comprises of steps; consolidating information related to users 110, assigning weightage to the information 120, computing aggregate weighted score for the information 130, computing weighted average of the aggregated weighted scores 140. The weightage average score is the trust score based on which trust level is assigned. In step 110 the information related to the user operatively associated with the web based platform is consolidated from all the web based platform the user is associated with. The trust ranking system uses social connector 360 to connect to the web based platforms to which the user is associated with and consolidate the information required for calculating trust score. Prior art suggest that all the social networking sites provides connectors (for example Facebook's social plugins) which exposes Application Programming Interface (APIs) allowing third parties to programmatically connect and interact with the social networking sites. Using these plugins and connector the trust ranking system consolidates the information about the user. The information comprise the activities of the user across web based platform, the responsiveness of the user against various activities across the web based platform, ratings received by the user across the web based platform, text and contents reviewed and posted by the user across the web based platform, comments, posts, member groups or communities, common friends list and personal interests. In step 120 of the method a weight is assigned to each of the information related to the user for the purpose of calculating trust score. The weight to each of the information is assigned based upon the importance of the information for calculating trust score. The weight assignment to each of the information related to the user can vary. Further in step 130 aggregated weighted score for each of the plurality of information is computed. The aggregated weighted score is calculated for the information related to the user available across all the web based platform the user is operatively associated with. In step 140 of the method weighted average of the aggregated weighted scores of the information is calculated which is the overall trust score of the user. Based upon trust score the user is assigned a trust level.

Example 1

According to an exemplary embodiment of the invention, following formula is employed in calculating the weighted average score of aggregated weighted score of the information for arriving at overall trust score. If the social user has obtained aggregated weighted activity score of 'a', aggregated weighted responsiveness score of 'r', aggregated weighted postings score of 'p' and aggregated weighted attitude score of 't'. The trust ranking algorithm would assign weights for each of these individual scores to align the overall score towards calculating social user's online trust. A sample weight assignment is given below:

| Category | Weight |
| --- | --- |
| Aggregated Weighted Activity Score | 0.2 |
| Aggregated Weighted Responsiveness Score | 0.3 |
| Aggregated Weighted Postings Score | 0.1 |
| Aggregated Weighted Attitude score | 0.4 |

Weighted average Score (Overall Trust Score) = (0.2 * a + 0.3 * r + 0.1 * p + 0.4 * t)/(a + r + p + t)

The weighted average score is the overall trust score based on which a trust level is assigned to the user.

According to an embodiment of the invention the weight assigned to each of the plurality of the information is dynamic in nature. According to an exemplary embodiment trust ranking system uses text analytics to analyze data or content of the information it has aggregated to understand the 'confidence level' or 'data threshold' or minimum amount of data required to assign a weight for calculating score of the information. If the data or content is sufficient then the trust ranking system places 'high confidence' for that information and the information is eligible for weight assignment. For example if the engine has aggregated enough data to calculate the weighted attitude score then the system places 'high confidence' in the attitude score. Trust ranking system eventually assigns the highest weightage for the attitude score as the attitude is positively correlated to the users trust score. In an alternate example if the system gets less content or data for computing attitude score or alternatively it does not find any data to calculate the attitude score then the system places 'low confidence' in the attitude score. As a result the system does not assign high weightage for attitude score for the calculation of overall trust score. The system then falls back to the best alternative to the attitude score. For example if the system falls back to responsiveness score in this embodiment then the responsiveness score gets the highest weightage. This is an exemplary embodiment and applies to all the categories of the information.

Figure 2:
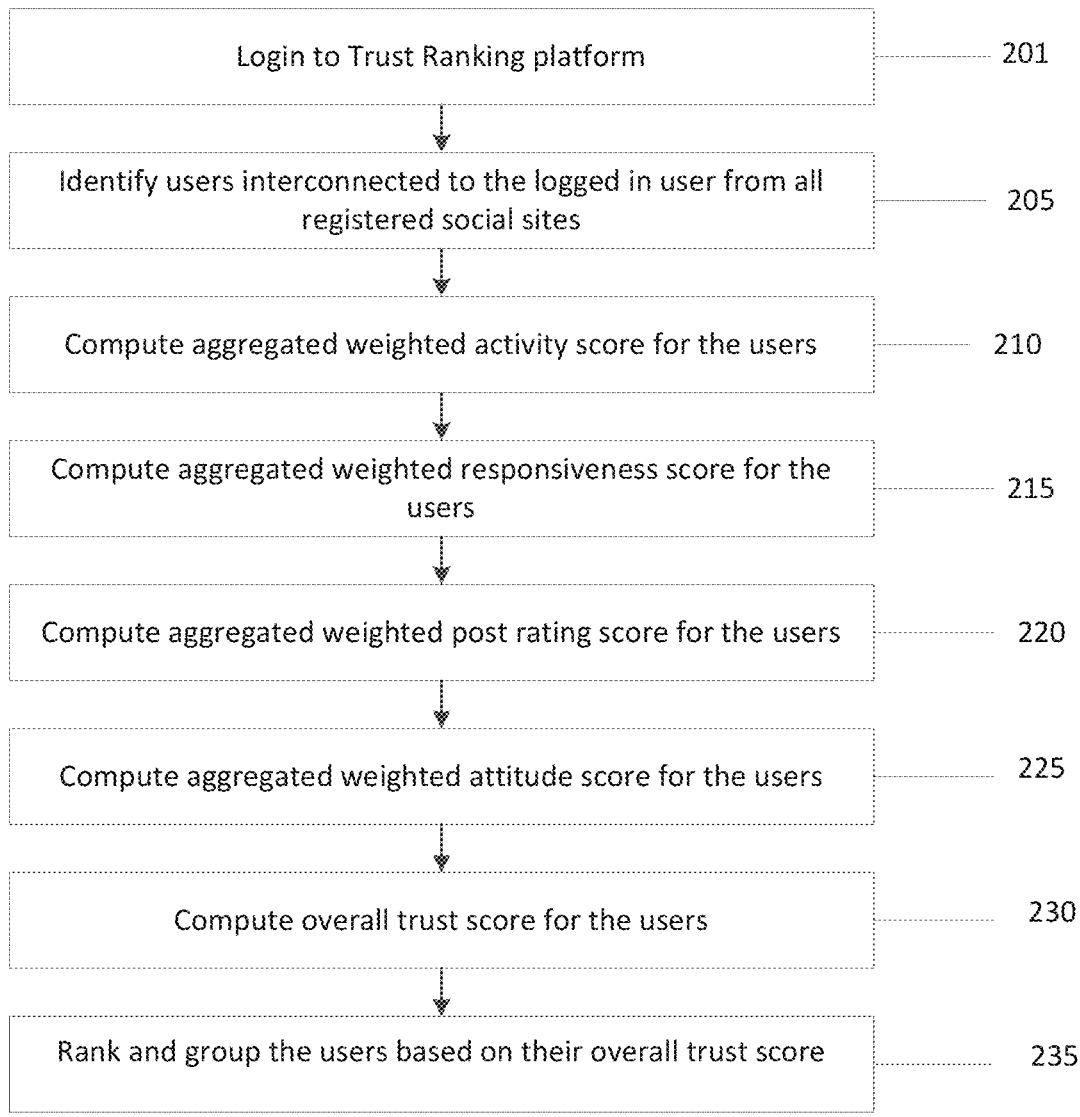
FIG. 2 shows an exemplary process flow for calculating trust score of user operatively associated with the web based platform based on various exemplary information.

FIG. 2 shows an exemplary process flow for calculating trust score of user operatively associated with the web based platform based on various exemplary information. According to an embodiment of the invention the user logs on a Trust Ranking Platform 201. Once the user logs in, the platform uses its social connecters to connect to social sites and identify the common friends or users or social contacts interconnected to the logged-in user from all the social sites, step 205. After identification of the common friends all related information for each of the common friends are aggregated from all the social sites. Further the common friends are the users or social contacts interconnected to each other on social site and are interconnected and operatively associated with the logged-in user. The information includes all the activities and attributes of the users on web based platform to which user is operatively associated with. The information comprise the activities of the user across web based platform, the responsiveness of the user against various activities across the web based platform, ratings received by the user across the web based platform, text and contents reviewed and posted by the user across the web based platform, comments, posts and personal interests.

According to an embodiment of the invention aggregated weighted activity score for the users are computed, step 210. Further the activities include but are not limited to quantifiable activities. All the quantifiable activities are collected from the social networking sites to which the users are associated with. The social networking site includes but is not limited to online forums and online communities. According to an embodiment the social sites includes but is not limited to social networking sites comprising Facebook, Google plus, LinkedIn, Twitter, Yahoo Group; special interest groups in which user is participating, public and private discussion forums, technical forums, public and private blogs, communities, discussion groups; public and private media sharing sites, public and private micro blogging sites, public and private bookmarking sites, public and private information collaboration sites, social news sites, social Q & A sites, review and recommendation sites. Further the list of the social networking sites will be dynamically expanded by the trust ranker based on social sites popularity and usability.

According to an embodiment of the invention quantifiable structured activities are aggregated for calculating the activity score. Further a quantifiable social activity is the one which provides a straight-forward numerical value like number of member groups, number of posts and alike. Trust ranking engine's quantifiable activities include but is not limited to Number of appreciations or recommendations given by peers to the user in social sites, number of friends in various sites, positive ratings given by friend's peers participating in community activities, number of activities of intellectual communities, number of participations in online social welfare or charity activities, number of active moderations of the online community or group, number of promotions for an online noble causes and number of useful online events organized. Further quantifiable structured activities are dynamically expanded by trust ranking engine. The quantifiable structured activities from all web based platform is aggregated for the user and weight is assigned by the trust ranking engine to each of the plurality of the activities. Further the assignment of weight varies and weight is assigned based upon the nature of activities. According to an exemplary embodiment an activity of promoting a fund raising event or a social cause is given more weightage than an activity that promotes a general get-together event. The weights are purely assigned for calculating overall trust score. Based upon the weight assigned to each of the plurality of activities overall weighted activities score for the friend is calculated. Further the quantifiable activities are factored to arrive at a cumulated activity score for the user. For instance user activities such as promoting an online charity event, creating/moderating an online self-help group etc. will be factored in to arrive at aggregated weighted activity score.

Example 2

According to an exemplary embodiment, calculation for aggregated weighted activity score is given below with sample weights and sample activity list. Considering that current set of structured activities is as mentioned in the table below with their weights:

| Quantifiable Structured Activity | Weight |
| --- | --- |
| Number of appreciations/recommendations given by peers to the user in social sites | 0.1 |
| Number of social groups user is subscribed to | 0.05 |
| Number of social groups/communities user is moderating | 0.05 |
| Number of intellectual communities user is subscribed to | 0.1 |
| Number of online social welfare/charity activities user is participating | 0.3 |
| Number of promotions for a noble/social cause user has organized | 0.4 |

Aggregated weighted activity score = (0.1 * number of recommendations + 0.05 * number of member groups + 0.05 * number of moderating groups + 0.1 * number of member intellectual communities + 0.3 * number of online social welfare activities + 0.4 * number of online promotions for noble cause)/(number of recommendations + number of member groups + number of moderating groups + number of member intellectual communities + number of online social welfare activities + number of online promotions for noble cause).

According to an embodiment the aggregated weighted score is calculated for each of the plurality of the information of the user as described by the exemplary embodiment.

According to an embodiment of the invention responsiveness of users toward the activities on web based platform is aggregated. Further aggregated weighted responsiveness score is computed, step 215. According to an embodiment responsiveness is a factor of response time and accuracy or likings of the provided response. The responsiveness is calculated towards the quantifiable activities including but is not limiting to response in technical or health forums, responses given in Q & A forums, responses in terms of providing solutions in specialty community groups. Responsiveness is calculated for each of the pluralities of quantifiable activity. Further weights are assigned for each of plurality of the responses. Aggregated weighted responsiveness score is calculated based up the weights assigned to each of the pluralities of the responses. The assignments of weights vary for each of the plurality of responses based upon the theme. Accordingly more sensitive themes are weighted more than a general topic. For example an accurate response to health question is weighted more than a response to a movie topic. Furthermore the responses and assignment of weights to each of the plurality of the responses will be dynamically expanded based on change in social media landscape and its activities on web based platform. Further prompt and accurate responsiveness is a critical factor in trust.

According to an embodiment of the invention aggregated weighted post rating score of the users is computed, step 220. Each of the plurality of ratings on posts by the user is aggregated and weighted average is calculated for the post ratings. Post comprises the contents at least posted, referred, liked, shared or reviewed by the user. Post rating score of the user is calculated on the factors including but not limiting to likings obtained by the user's post, ratings obtained by the users post, number of shares of the post. Weight is assigned to each of the plurality of post ratings. The overall weighted score for plurality of post ratings is calculated. Further assignment of weights to each of the post ratings can vary based upon theme of the post and the ratings received by the post.

According to an embodiment aggregated weighted attitude score of the user is computed, step 225. Text based attitude analysis is done by text analyzer 340 of trust ranking engine. Trust ranking engine compiles list of pluralities of contents and postings by the user on web based platforms. Text analyzer 340 comprises of sentiment analyzer components and positivity analyzer component 342. According to an embodiment sentiment analyzer component 342 uses text analytics and natural language processing techniques to identify attributes of the user comprising of sentiments, emptions, polarity, objectivity, subjectivity and mood present in the text. A Weight to each of the attribute is assigned. Further the weight is assigned based on the positivity or negativity of the sentiments. Further the sentiment analyzer computes the sentiment score for the users based upon the attributes analyzed. According to an embodiment the positivity analyzer component 344 uses word based text analytics technique to identify attributes including but not limiting to positive or negative expressions, feelings and moods in the content posted or reviewed by the user. Further weight is assigned to each of the attributes. Furthermore positive expressions may be weighted more than the negative expressions. According to an embodiment trust ranking algorithm calculates overall attitude score based on sentiment score and positivity score. Word based text analysis is done to find out the subjectivity, polarity, objectivity and then the sentiment expressed in the content including positive opinion indicators, negative thought indicators, sad/dullness indicators, angry/frustration indicators. All the indicators are factored-in to arrive at the overall attitude score.

According to an embodiment of the invention overall trust score for the user is calculated, step 230. Trust ranking algorithm calculates overall trust score for the user by computing weighted average of the weighted activity score, weighted responsiveness score, weighted ratings score and weighted attitude score. According to an embodiment the trust score is used to rank the users on basis of scores, step 235. Further a trust rank or level is assigned to each of the friends of the user based upon the trust score. Further the method enables a user to create a web of friends based upon the trust score obtained by each of the friends.

Figure 3:
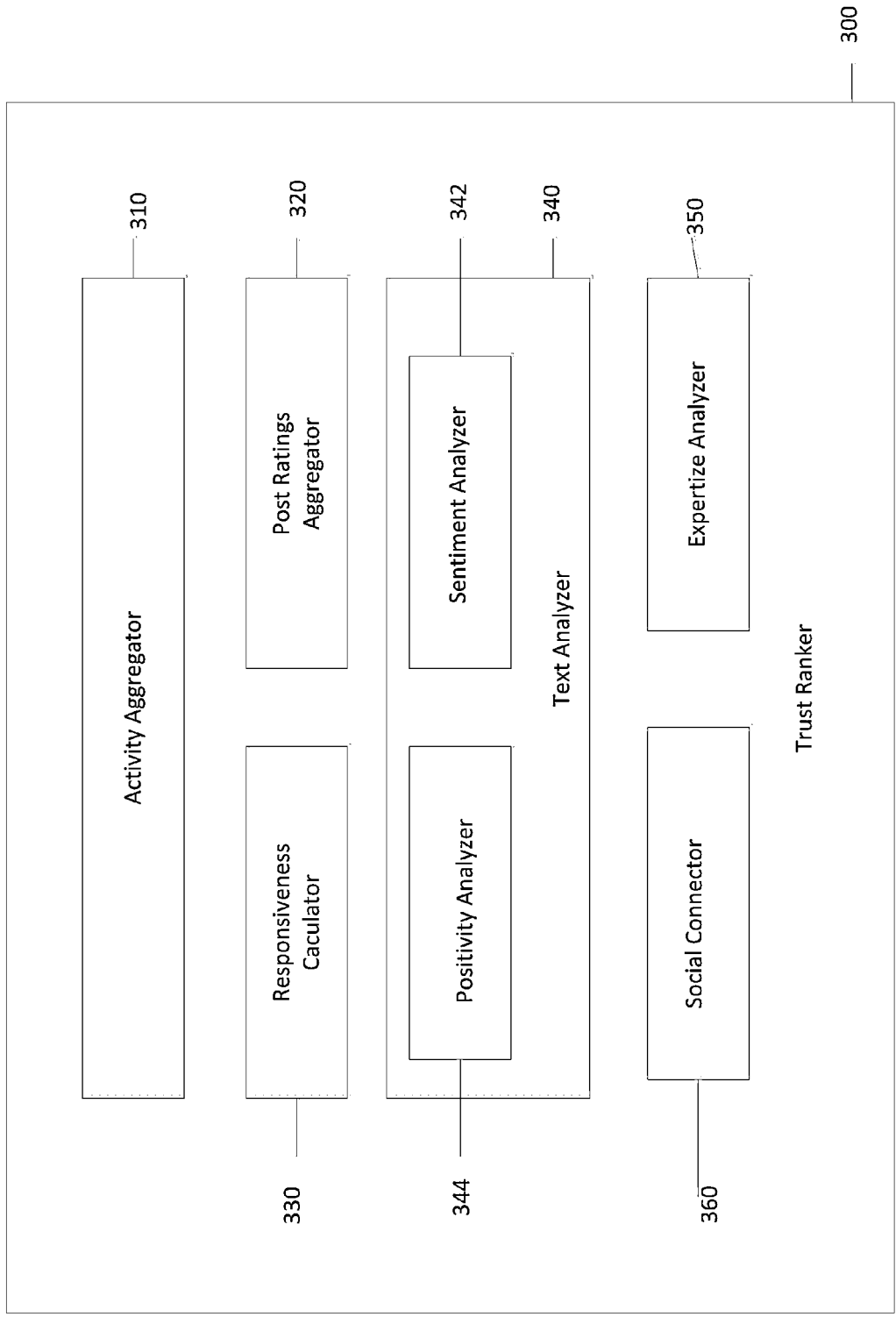
FIG. 3 shows an exemplary architecture of components of trust ranking system.

FIG. 3 shows an exemplary architecture for components of trust ranking system 300. According to an embodiment of the invention, the system 300 has access to all social sites to which the user is operatively associated with through its component social connector 360. The system comprises of activity aggregator 310, post ratings aggregator 320, responsiveness calculator 330, text analyzer 340, expertise analyzer 350 and social connector 360. Text analyzer comprises of positivity analyzer 342 and sentiment analyzer 344. The activity aggregator 310 aggregates all the quantifiable activities of a user from the social sites to which the user is registered and is operatively associated with. The aggregated quantifiable activities are factored to arrive at a cumulated activity score of the user. Responsiveness calculator 330 measures the responsiveness of the user in the entire web based platform to which user is operatively associated with and calculates the cumulated responsiveness score. Post ratings aggregator 330 derives an aggregate post ratings score based on positive ratings received by users in response to user's comments, post, recommendations and answers in the entire web based platform to which the users is operatively associated with. Text analyzer 340 analyses the content of the user in entire web based platform user is operatively associated with. Further text analyzer 340 comprises of sentiment analyzer 342 and positivity analyzer 344. Sentiment analyzer 342 extract pluralities of attitudinal information comprising sentiment, opinion, mood and emotion from the contents posted, reviewed or referred by the user and positivity analyzer 344 use text analyzing techniques to identify the positive attitude in the comments posted and reviewed by the user in the entire web based platform the user is associated with. Text analyzer 340, sentiment analyzer 342 and positivity analyzer 344 calculate the aggregate attitude score of the user. Expertise analyzer 350 analyzes topics of interest for the user and the accuracy of answers posted by the user in that particular topic. Expertise analyzer 350 analyze and aggregate the list of expertise of the user in various topics. Expertise analyzer 350 enables the network of users to select social connects or friends based on expertise of topic. Expertise analyzer 350 further suggest the network of users an expert user in related topic when at least a user addresses a query in the topic. The social connector 360 provide connection to social networking sites member or subscribed social sites and aggregate content or data or activities required by the engine for its calculation.

Figure 4:
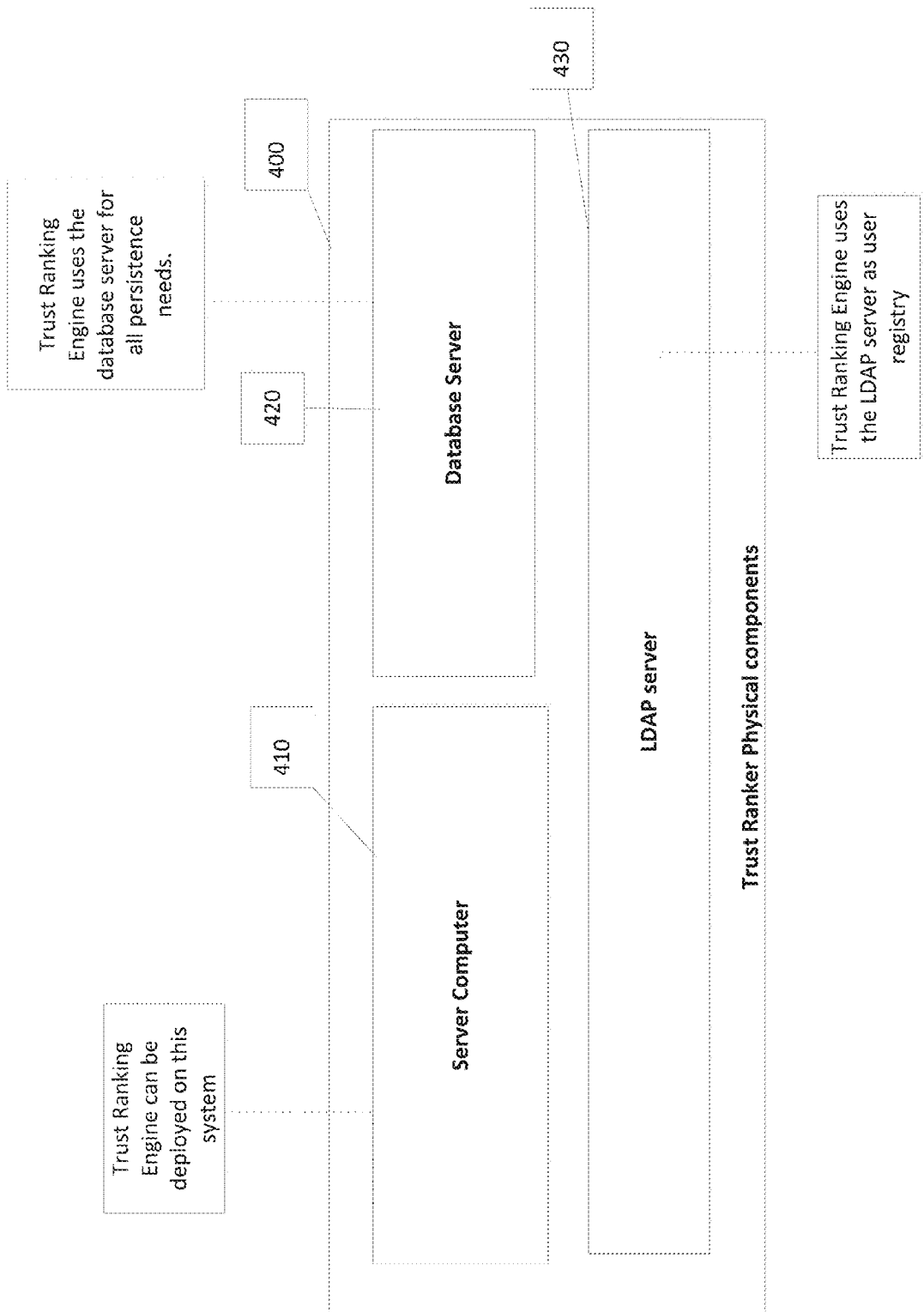
FIG. 4 shows an exemplary architecture of physical components of trust ranking system.

FIG. 4 shows an exemplary architecture for physical components of trust ranking system 400. 400 comprises of server computer 410, database server 420, and LDAP (Lightweight Directory Access protocol) server 430. According to an embodiment of the invention server computer 410 hosts the trust ranking engine or trust ranking software. Server computer 410 is responsible for serving the response over HTTPS (Hypertext Transfer Protocol Secure) to the requesting clients. The main server computer 410 operates in networked environment which is connected to network via network interface. Further database server 420 provides all the persistence storage requirements of the trust ranking software including but not limiting to storing training model data, application data. LDAP server 430 acts as a user registry which stores the entire user account details. Trust ranking software or trust ranking engine extensively uses LDAP server 430 as user registry.

Figure 5:
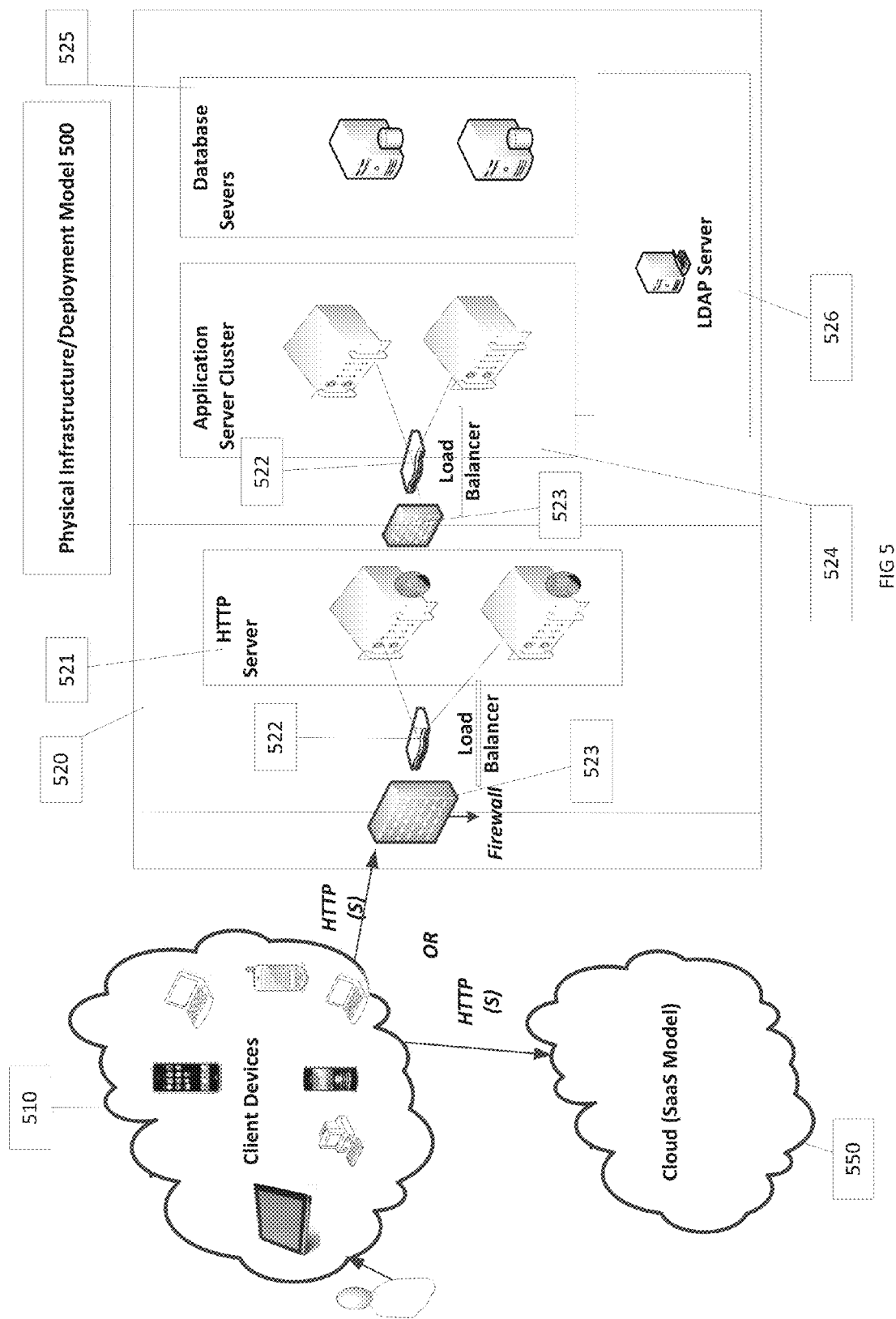
FIG. 5 shows an exemplary architecture for deployment model of trust ranking system.

FIG. 5 shows an exemplary architecture for deployment model 500 of trust ranking system. According to an exemplary embodiment the deployment model 520 comprises of HTTP server 521, load balancer 522, firewall 523, application server cluster 524, database server 525 and LDAP server 526. According to an embodiment of the invention user can connect to trust ranking platform via each of plurality of client devices 510. Client devices 510 includes but is not limited to desktop, laptops, handheld devices, smartphones, kiosks, tablets, PDA (Personal Digital Assistant). According to an embodiment of the invention trust ranking supports multiple deployments including but not limiting to In-house deployment 520 and Cloud deployment 550. 520 is traditional deployment model wherein organizations host the Trust Ranking software to the servers in their environment. Further the platform also exposes the services for third party consumption.

Figure 6:
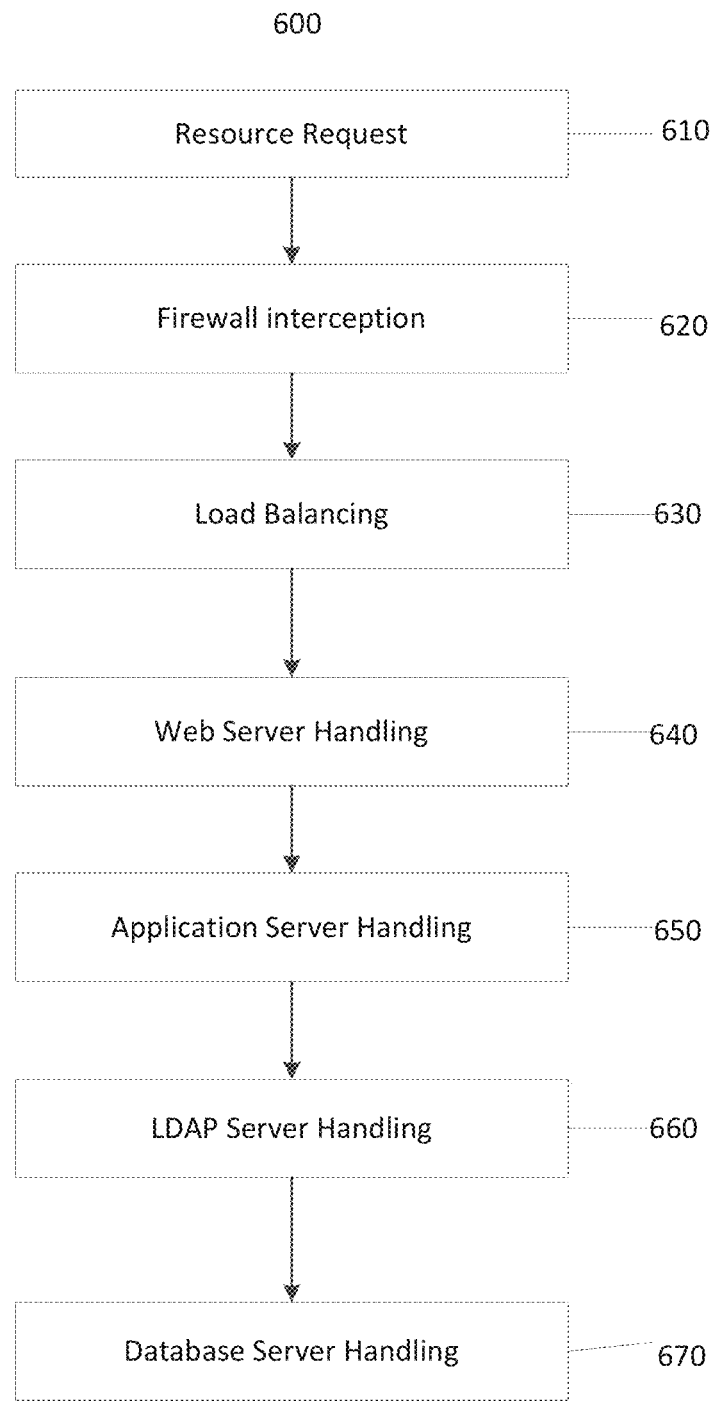
FIG. 6 shows an exemplary process flow for deployment of trust ranking system.

FIG. 6 shows an exemplary process flow for deployment of trust ranking engine for In-house deployment 520. According to an embodiment of the invention for In-house deployment of Trust Ranking engine user initiates the request 610 for trust ranking platform via one of the client devices. The request can be made over HTTP or HTTPS based on the security requirements. Further there is firewall interception 610 wherein the request is intercepted by corporate firewall 523 which ensures that the request is done on allowed ports and provides other security features including but is not limited to tunneling, IP checks, protocol enablement, caching, request routing and spam filtering. Further in step of load balancing 630, hardware load balancer 522 routes the request to the corporate web server 521 based on current load so as to provide optimum response time and optimum load handling. The request proceeds to the step of web server handling 640. The request is handled by corporate web servers 521. Further web server 521 are optimized to handle the static web assets including but not limiting to images, Java Script (JS), Cascading Style Sheets (CSS) and Java Script Object Notation (JSON). Furthermore 521 provide additional features like caching. Further it has plugins to route the request to the corresponding application servers 524. The request is further routed for application server handling 650. 524 is the main hardware server component which runs the trust ranking software. According to an exemplary embodiment 524 exist in pluralities which are horizontally and vertically clustered to handle the peak load with acceptable Service Level Agreements (SLAs). Trust Ranking software running on these servers process the request. The request is further processed to LDAP server handling 660. According to an embodiment if a trust ranking engine user logs in for first time the user's credential is authenticated. A dedicated LDAP server 526 stores users credentials and other user profile related information. During request processing cycle, the data which needs to be persisted by software persists in database software running on database server 525 and request is processed for database server handling 670. Pluralities of database servers 525 are present in production environment to handle peak load and provide optimum response times. According to another embodiment of the invention the trust ranking software can be hosted in the cloud environment.

Figure 7:
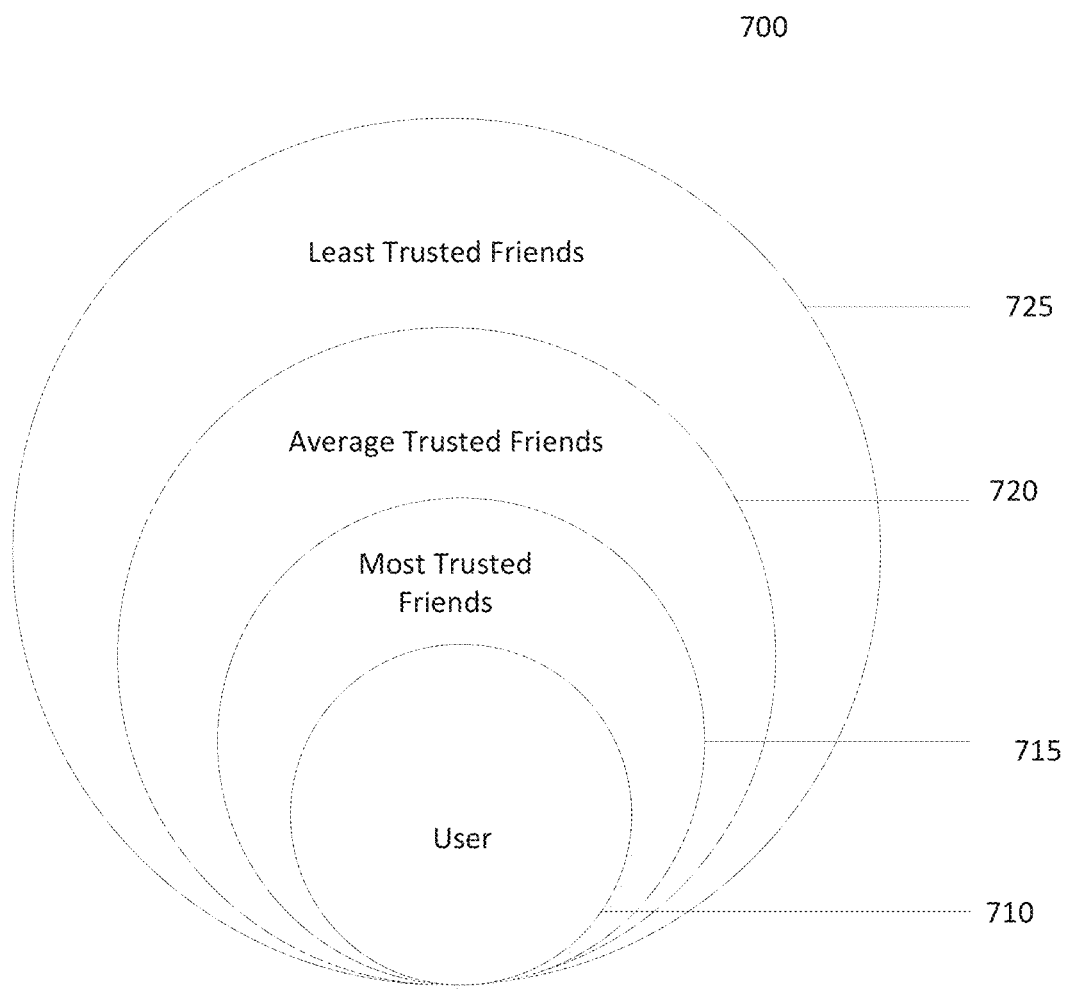
FIG. 7 shows an exemplary view of web of friends based on trust score.

FIG. 7 shows an exemplary view of web of friends based on trust score. For the purpose of this invention fiends here include but are not limited to the social contact to which the user is interconnected on the web based platform. According to an embodiment of the invention the trust score is used in grouping and ranking the friends based on their trust score. The web of friends 700 is created by the user 710 based upon the trust scores obtained by the friends. The friends can be classified as most trusted friends 715 the friends with maximum trust score, average trusted friends 720, the friends with average trust score and least trusted friends 725 the friends with minimum trust score. The web of friends 700 enable a user to share data and information with friends based upon the level of trust they share with the user. It enables a user to filter friends to share sensitive information with. It also helps to decide level of interaction with a friend. Further it enables the user for privacy setting of profile based upon the trust level of friends. Furthermore it enables user to allow permitted view of contents based upon the trust level. Still further it enables user to filter any profile information.

In an alternative embodiment of the invention activity score computed by trust score of the trust ranking engine or trust ranking algorithm is used to identify the commonality of interests or activities between the user and its social contacts or friends. Further the user can be alerted by red flags raised by the Trust Ranking Engine to get know at least a potentially serious trends of its social contact. Further the social contact includes but is not limited to online companion and chat buddies.

FIG. 8 shows an exemplary computing environment. One or more of the above-described techniques can be implemented in or involve one or more computer systems. FIG. 8 illustrates a generalized example of a computing environment 800. The computing environment 800 is not intended to suggest any limitation as to scope of use or functionality of described embodiments.

With reference to FIG. 8, the computing environment 800 includes at least one processing unit 810 and memory 820. The processing unit 810 executes computer-executable instructions and may be a real or a virtual processor. In a multi-processing system, multiple processing units execute computer-executable instructions to increase processing power. The memory 820 may be volatile memory (e.g., registers, cache, RAM), non-volatile memory (e.g., ROM, EEPROM, flash memory, etc.), or some combination of the two. In some embodiments, the memory 820 stores software 880 implementing described techniques. Further the memory 820 across multiple servers is clustered to replicate cache data.

A computing environment may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800. An operating system controls all the hardware components.

The storage 840 may be removable or non-removable, and includes hard disks, magnetic disks, magnetic tapes or cassettes, CD-ROMs, CD-RWs, DVDs, flash memory card, modem, router or any other medium which can be used to store information and which can be accessed within the computing environment 800. In some embodiments, the storage 840 stores instructions for the software. Further it is designed to handle large amount of program data, cache offload and to run any complimentary or supporting software for the main software for implementing the described invention.

The input device(s) 850 may be a touch input device such as a keyboard, mouse, pen, trackball, touch screen, or game controller, a voice input device, a scanning device, a digital camera, or another device that provides input to the computing environment 800. The output device(s) 860 may be a display, printer, speaker, or another device that provides output from the computing environment 800.

The communication connection(s) 870 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 800, computer-readable media include memory 820, storage 840, communication media, and combinations of any of the above.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

As will be appreciated by those ordinary skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

The following description is presented to enable a person of ordinary skill in the art to make and use the invention and is provided in the context of the requirement for a obtaining a patent. The present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

What is claimed is:

1. A computer implemented method for calculating trust level of a connected user connected to a second user on social networking sites, the method comprising:
    consolidating information for a plurality of consolidated information categories related to the connected user operatively associated with at least a web based social platform;
    assigning category weights to the consolidated information categories based on confidence levels for respective of the categories;
    based on the consolidated information, computing aggregated weighted scores for respective of the categories; and
    by at least one hardware processing unit, computing a trust score of the connected user, wherein computing the trust score comprises computing a weighted average of the aggregated weighted scores for the consolidated information categories, wherein computing the weighted average comprises applying the category weights assigned to respective of the consolidated information categories to the aggregated weighted scores for the categories.

2. The method of claim 1, further comprising assigning a trust level to the connected user based upon the trust score.

3. The method of claim 1, further comprising sending a recommendation recommending the connected user to the second user for at least a social contact or friendship on the web based social platform based upon the trust level.

4. The method of claim 1, further comprising:
    creating a web of trust for social contacts or friends on the web based social platform, wherein the web of trust comprises most trusted friends, average trusted friends and least trusted friends.

5. The method of claim 1, further comprising:
    sharing information and interaction of the second user based on the trust level of the connected user.

6. The method of claim 1, wherein the information comprises the connected user's activities, responsiveness in social networking sites, interactions, comments, posts, ratings received, information about attitude and behavior, subject matter expertise, online social welfare activities, intellectual activities and personal interests.

7. A system for calculating a trust level of a user connected to a second user on social networking sites, the system comprising:
    at least one processing unit;
    memory;
    an aggregator to aggregate activities of the user on at least a web based social platform;
    a calculator to calculate a cumulated activity score based on the aggregated activities on the web based social platform;
    a calculator to provide a cumulated responsiveness score by calculating responsiveness of the user on the web based social platform;
    an aggregator to provide an aggregated post ratings score based on ratings obtained by the user on the web based social platform;
    a text analyzer to analyze text used by the user on the web based social platform wherein the text analyzer comprises a sentiment analyzer component and a positivity analyzer component wherein at least the text analyzer, the sentiment analyzer component, or the positivity analyzer component is used to calculate an attitude score of the user;
    an expertise analyzer to analyze subject matter expertise of the user;
    wherein category weights are assigned to the cumulated activity score, cumulated responsiveness score, aggregated post ratings score, and attitude score based on confidence levels for the scores; and
    wherein a trust score calculation of the user is performed, and the trust score calculation comprises computing a weighted average of the scores, wherein computing the weighted average comprises applying the category weights to the scores.

8. The system of claim 7, wherein the sentiment analyzer component identify identifies a plurality of attributes comprising sentiment, emotion, objectivity, subjectivity, and mood present in the text used by the user, based on text analytics and natural language processing techniques.

9. The system of claim 7, wherein the positivity analyzer component identifies attributes comprising positive expression, negative expression, feelings, and moods in the text used by the user, based on text analysis techniques.

10. The system of claim 7, wherein the expertise analyzer analyzes the subject matter expertise of the user by analyzing at least a topic of interest and accuracy of answers posted by the user on the topic.

11. The system of claim 7, wherein the ratings are obtained for content at least posted, referred, liked or reviewed by the user.

12. The system of claim 11, wherein the text used by the user is present in the content at least posted, referred, liked or reviewed by the user.

13. The system of claim 7, wherein the system consolidates information of the user and calculates a trust score of the user, wherein the trust score is a weighted average of the cumulated activity score, the cumulated responsiveness score, the attitude score and the aggregated post ratings score.

14. The system of claim 7, wherein the system uses the cumulative activity score or a commonality of at least activities or interests to recommend a social contact or a friend or an activity to the user.

15. A system for calculating a trust level of a connected user connected to a second user on social networking sites, the system comprising:
    a memory; and
    a processor operatively coupled to the memory, the processor configured to perform the steps of:
    consolidating information for a plurality of consolidated information categories related to the connected user operatively associated with at least one web based social platform;
    assigning category weights to the consolidated information categories based on confidence levels for respective of the categories;
    based on the consolidated information, computing aggregated weighted scores for respective of the consolidated information categories; and
    computing a trust score of the user, wherein computing the trust score comprises computing a weighted average of the aggregated weighted scores, for the consolidated information categories, wherein computing the weighted average comprises applying the category weights assigned to respective of the consolidated information categories to the aggregated weighted scores for the categories.

16. The system of claim 15, the processor further configured to perform the step of:
    assigning a trust level to the user based upon the trust score.

17. The system of claim 16, the processor further configured to perform the step of:
    recommending the user to a second user for at least a social contact or friendship on the web based social platform based upon the trust level.

18. A non-transitory computer readable medium storing code that, when executed by a computing device, performs a method for calculating a trust level of a connected user connected to a second user on a plurality of social networking sites, the method comprising:
    consolidating information for a plurality of consolidated information categories related to the connected user operatively associated with at least one web based social platform, wherein the categories comprise (i) activities of the connected user across the web based social platform, (ii) responsiveness of the connected user against various activities across the web based social platform, and (iii) ratings received by the connected user across the web based social platform and text and contents reviewed and posted by the connected user across the web based social platform;
    with the consolidated information, computing aggregated weighted scores for respective of the categories;
    assigning respective category weights to the consolidated information categories based on confidence levels for respective of the categories; and
    computing a trust score of the connected user with respect to the second user, wherein computing the trust score comprises computing a weighted average of the aggregated weighted scores for the consolidated information categories via the category weights assigned to respective of the consolidated information categories.

19. The non-transitory computer readable medium of claim 18, wherein the method further comprises:
    assigning a trust level to the connected user based upon the trust score.

20. The non-transitory computer readable medium of claim 19, wherein the method further comprises:
    recommending the connected user to the second user for at least a social contact or friendship on the web based social platform based upon the trust level.

* * * * *